United States Patent
Huang (10) Patent No.: US 9,952,726 B2
(45) Date of Patent: Apr. 24, 2018

(54) TOUCH MODULE WITH ENGAGED ELECTRODE STRUCTURE

(71) Applicants: INTERFACE OPTOELECTRONIC (SHENZHEN) CO., LTD., Shenzhen (CN); GENERAL INTERFACE SOLUTION LIMITED, Miaoli County (TW)

(72) Inventor: Kung-Chieh Huang, Hsinchu (TW)

(73) Assignees: INTERFACE OPTOELECTRONIC (SHENZHEN) CO., LTD., Shenzhen (CN); GENERAL INTERFACE SOLUTION LIMITED, Zhubei (TW)

( * ) Notice: Subject to any disclaimer, the term of this patent is extended or adjusted under 35 U.S.C. 154(b) by 145 days.

(21) Appl. No.: 14/858,344

(22) Filed: Sep. 18, 2015

(65) Prior Publication Data
US 2016/0320883 A1    Nov. 3, 2016

(30) Foreign Application Priority Data

Apr. 29, 2015    (CN) .......................... 2015 1 0211182

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2012/0227259 A1* | 9/2012 | Badaye | G06F 3/044 29/846 |
| 2013/0141369 A1* | 6/2013 | Huang | G06F 3/041 345/173 |
| 2014/0240616 A1* | 8/2014 | Huang | G06F 1/1692 349/12 |
| 2014/0313169 A1* | 10/2014 | Kravets | G06F 3/044 345/178 |
| 2016/0195976 A1* | 7/2016 | Yang | G06F 3/0416 345/173 |

* cited by examiner

*Primary Examiner* — Ryan A Lubit
(74) *Attorney, Agent, or Firm* — ScienBiziP, P.C.

(57) ABSTRACT

A touch module includes a plurality of sensing electrodes partly crossing with each other and a plurality of signal lines electronically connected to a corresponding sensing electrode from amongst the plurality of sensing electrodes. Each sensing electrode includes a main sensing portion, a first sub-sensing portion, and a second sub-sensing portion. The first sub-sensing portion and the second sub-sensing are symmetrically located on opposite surfaces of the main sensing portion. The first sub-sensing portion includes a first solid portion. The second sub-sensing portion includes a second solid portion. The first sub-sensing portion defines a first receiving portion in a middle of first sub-sensing portion for receiving the second receiving portion of the adjacent and crossed sensing electrode. The second sub-sensing portion defines a second receiving portion from edges of the second sub-sensing portion for receiving the first receiving portion of the adjacent and crossed sensing electrode.

13 Claims, 6 Drawing Sheets

TOUCH MODULE WITH ENGAGED ELECTRODE STRUCTURE

CROSS-REFERENCE TO RELATED APPLICATIONS

This application claims priority to Chinese Patent Application No. 201510211182.1 filed on Apr. 29, 2015, the contents of which are incorporated by reference herein.

FIELD

The subject matter herein generally relates to a touch module.

BACKGROUND

A touch panel includes a plurality of sensing electrodes parallel with each other, a plurality of signal lines corresponding to the sensing electrodes, and a processor connected with the signal lines. The sensing electrodes are spaced a predetermined distance from each other. The distance between the adjacent electrodes are decreased by a pressure on the touch panel, which causes the signal output by the corresponding signal line to be adjusted. The processor process the signal output by signal line to detect a location of the touch operation on panel.

BRIEF DESCRIPTION OF THE FIGURES

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a touch module substrate for improving touch sensitivity.

Figure 1:
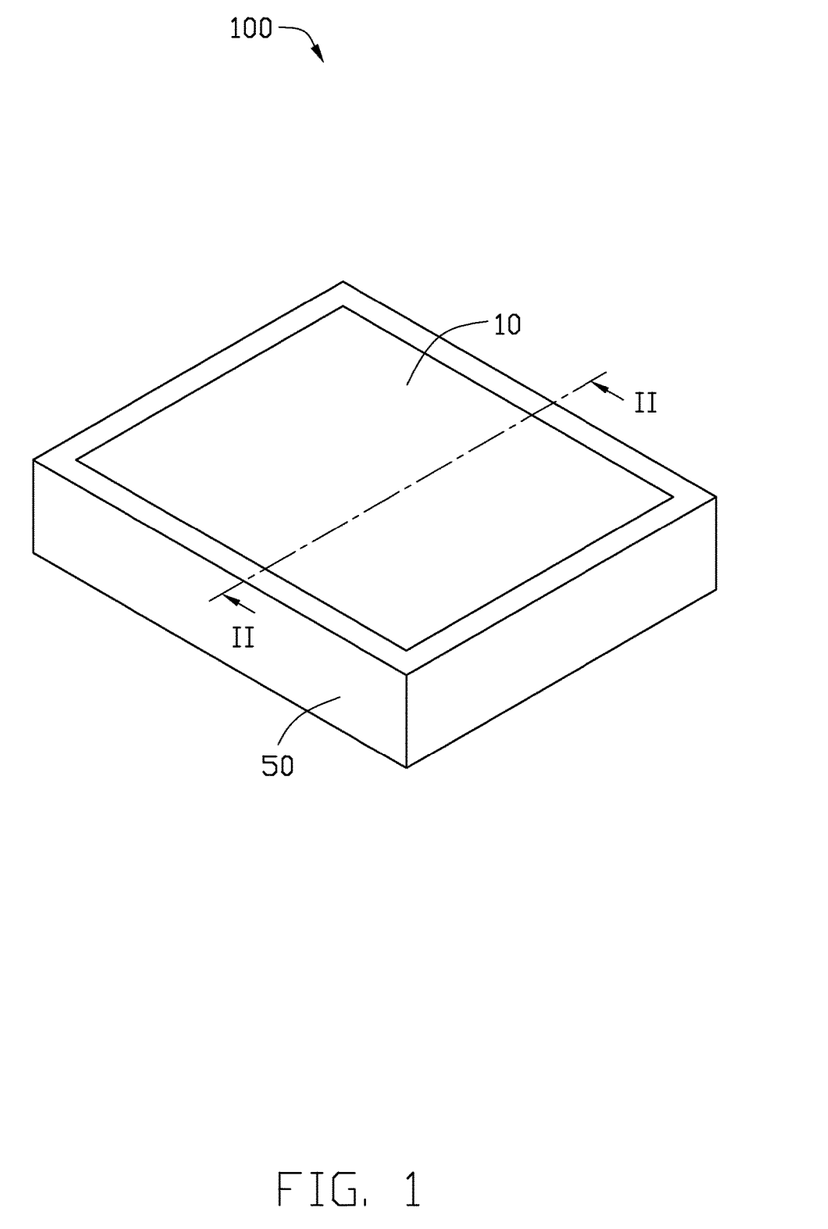
FIG. 1 is an isometric view of an embodiment of a touch display apparatus.
Figure 2:
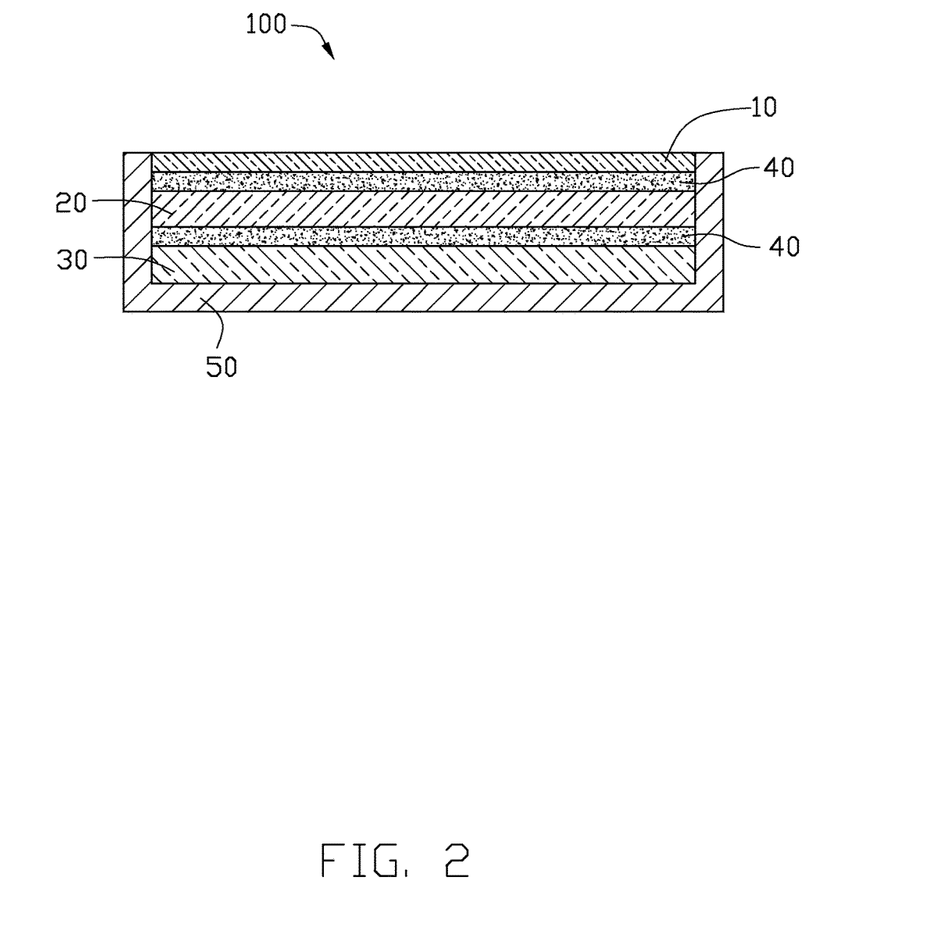
FIG. 2 is a cross-sectional view of an embodiment of the touch display apparatus of FIG. 1.

FIGS. 1-2 illustrate an embodiment of a touch display apparatus 100. The touch display apparatus 100 includes a cover lens 10, a touch module 20, a display module 30, and a casing 50. The cover lens 10, the touch module 20, and the display module 30 are overlapping, and adhered together via an adhesive layer 40. In at least one embodiment, the adhesive layer 40 is an optical clear adhesive (OCA). or an optical clear resin (OCR). The display module 30 is a liquid crystal display structure or an organic light emitting display structure. In other embodiments, the touch module 20 is directly formed on the cover lens 10 or integrated with the display module 30.

Figure 3:
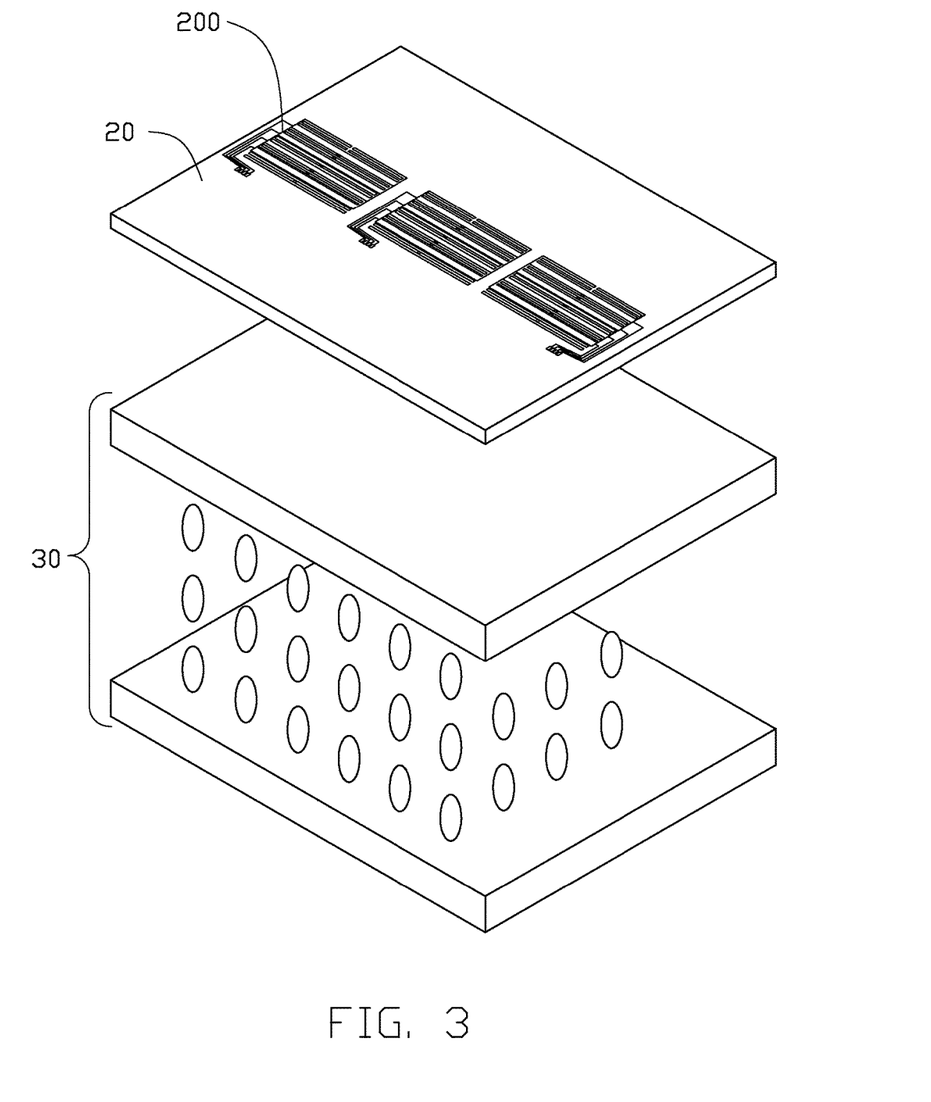
FIG. 3 is an exploded, isometric view of an embodiment of the touch display apparatus of FIG. 1, the touch display apparatus comprising a touch module with a plurality of sensing electrodes.
Figure 4:
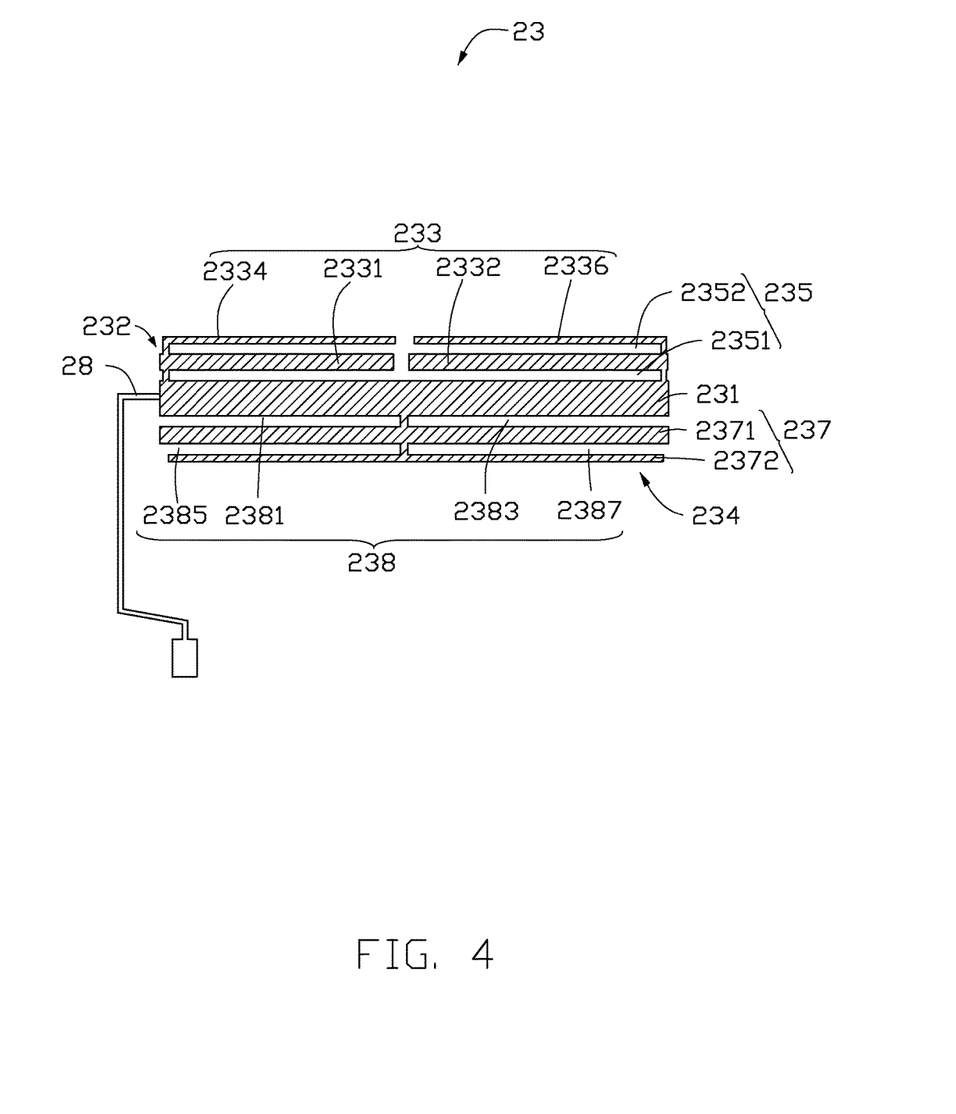
FIG. 4 is a plan view of a first embodiment of the sensing electrode of FIG. 3.
Figure 5:
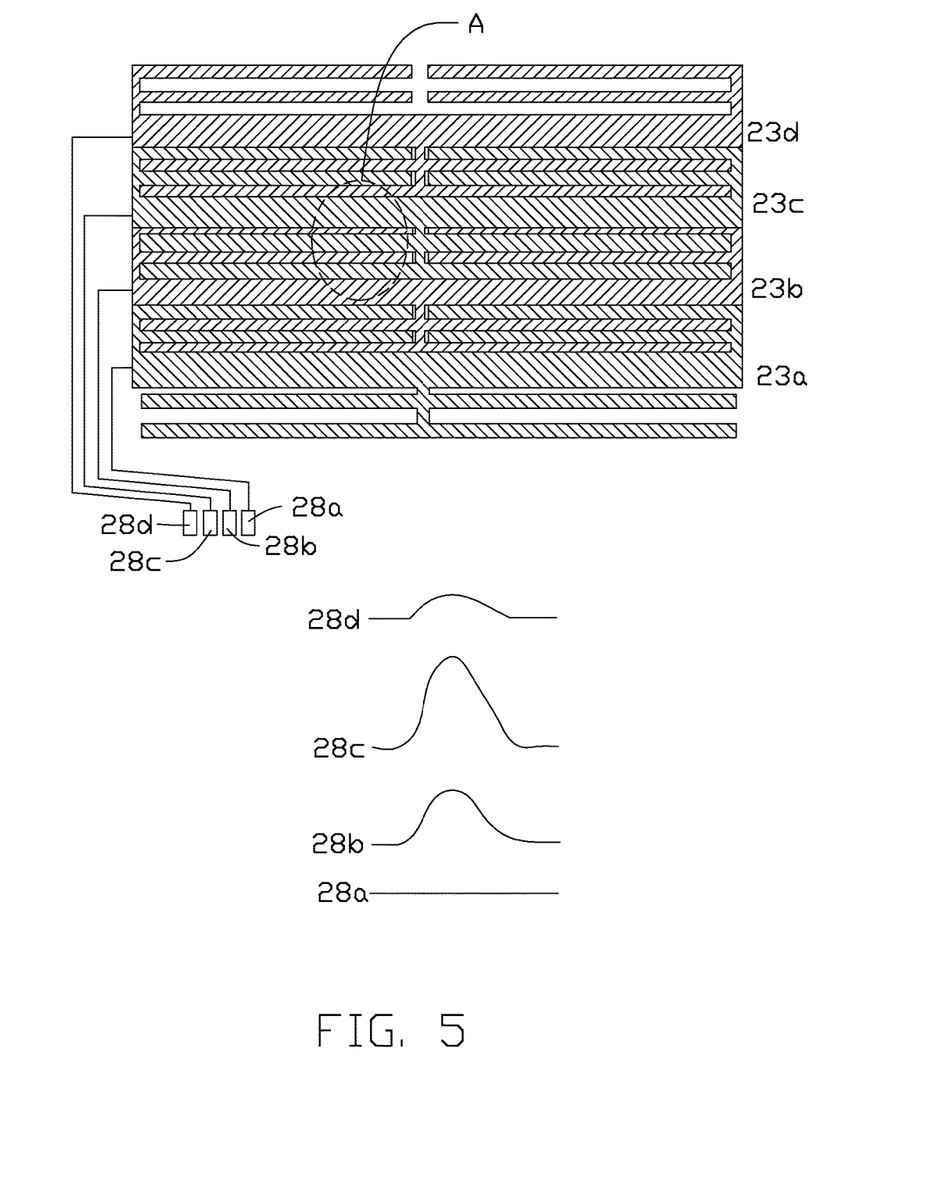
FIG. 5 is a waveform view of an embodiment of the sensing electrodes when being pressed of FIG. 4.

FIGS. 3-4 illustrate a first embodiment of the touch module 20. The touch module 20 includes a plurality of sensing electrode units 200 arranged in a line. Each sensing electrode unit 200 includes a plurality of sensing electrodes 23 and a plurality of signal lines 28 connected to the corresponding sensing electrode 23. Two adjacent sensing electrodes 23 are engaged with each other. The sensing electrode 23c is engaged with two adjacent sensing electrodes 23d, 23b where the sensing electrode 23c is placed between (as shown in FIG. 5).

The sensing electrode 23 includes a main sensing portion 231, a first sub-sensing portion 232, and a second sub-sensing portion 234. The first sub-sensing portion 232 and the second sub-sensing portion 234 are symmetrically located on opposite surfaces of the main sensing portion 231, and are electrically connected to the main sensing portion 231. The first sub-sensing portion 232 is received in the second sub-sensing portion 234 of the adjacent sensing electrode 23.

The main sensing portion 231 is substantially rectangular shaped. The first sub-sensing portion 232 includes a first solid portion 233. The first solid portion 233 includes a first sensing portion 2331, a second sensing portion 2332 spaced from the first sensing portion 2331, a third sensing portion 2334, and a fourth sensing portion 2336 spaced from the third sensing portion 2334. The first sensing portion 2331 and the second sensing portion 2332 are arranged in a line parallel with the main sensing portion 231. An end of the first sensing portion 2331 away from the second sensing portion 2332 is electrically connected to an end of the main sensing portion 231, and an end of the second sensing portion 2332 away from the first sensing portion 2331 is electrically connected to an opposite end of the main sensing portion 231. The third sensing portion 2334 is located on a surface of first sensing portion 2331 away from the main sensing portion 231, and the fourth sensing portion 2336 is located on a surface of the second sensing portion 2332 away from the main sensing portion 231. The third sensing portion 2334 and the fourth sensing portion 2336 are arranged in a line parallel with the main sensing portion 231. An end of the third sensing portion 2334 away from the fourth sensing portion 2336 is electrically connected to the end of the first sensing portion 2331, and an end of the fourth sensing portion 2336 away from the third sensing portion 2334 is electrically connected to the end of the second sensing portion 2332. The first sub-sensing portion 232 defines a first receiving portion 235. The first receiving portion 235 includes a first cavity 2351 and a second cavity 2352, parallel with the main sensing portion 231. The first cavity 2351 and the second cavity 2352 communicate with each other. The first sensing portion 2331, the second sensing portion 2332, the third sensing portion 2334, and the fourth sensing portion 2336 cooperate with each other to form the second cavity 2352. The first sensing portion 2331, the second sensing portion 2332, and the main sensing portion 231 cooperate with each other to form the first cavity 2351. In at least one embodiment, a distance between the first sensing portion 2331 and the third sensing portion 2334 is equal to a distance between the first sensing portion 2331 and the main sensing portion 231 for decreasing a difference capacitance of a parasitic capacitor formed by the first sensing portion 2331 and the third sensing portion 2334 and a parasitic capacitor formed by the third sensing portion 2334 and the main sensing portion 231, which cause the sensing process to be simple. Lengths of the first sensing portion 2331, the second sensing portion 2332, the third sensing portion 2334, and the fourth sensing portion 2336 are equal. A width of the first sensing portion 2331 is equal to the second sensing portion 2332, and a width of the third sensing portion 2334 is equal to the fourth sensing portion 2336. Widths of the main sensing portion 231, the first sensing portion 2331, and the third sensing portion 2334 are equal. In other embodiments, the widths of the main sensing portion 231, the first sensing portion 2331, and the third sensing portion 2334 are orderly decreased.

The second sub-sensing portion 234 is located on a lower surface of the main sensing portion 231. The second sub-sensing portion 234 includes a second solid portion 237. A pattern of the second solid portion 237 corresponds to a pattern of the first receiving portion 235. The second solid portion 237 includes a fifth sensing portion 2371 and a sixth sensing portion 2372 parallel with the fifth sensing portion 2371. The fifth sensing portion 2371 is located on a surface of the main sensing portion 231 away from the first sub-sensing portion 234. The sixth sensing portion 2372 is located on a surface of the fifth sensing portion 2371 away from the main sensing portion 231. A middle of the fifth sensing portion 2371 is electrically connected to the main sensing portion 231. A middle of the sixth sensing portion 2372 is electrically connected to the middle of the fifth sensing portion 2371. The second sub-sensing portion 234 defines a second receiving portion 238. A pattern of the second receiving portion 238 corresponds to a pattern of the first solid portion 233. The second receiving portion 238 includes a third cavity 2381, a fourth cavity 2383, a fifth cavity 2385, and a sixth cavity 2387. The third cavity 2381 and the fourth cavity 2383 are arranged in a line parallel with the main sensing portion 231, and are separated by the fifth sensing portion 2371. The main sensing portion 231 and the fifth sensing portion 2371 cooperate with each other to form the third cavity 2381 and the fourth cavity 2383. The fifth cavity 2385 and the sixth cavity 2387 are arranged in a line parallel with the main sensing portion 231, and are separated by the sixth sensing portion 2371. The fifth sensing portion 2371 and the sixth sensing portion 2372 cooperate with each other to form the fifth cavity 2385 and the sixth cavity 2387. In at least one embodiment, a distance between the main sensing portion 231 and the fifth sensing portion 2371 is equal to a distance between the fifth sensing portion 2371 and the sixth sensing portion 2372 for decreasing a capacitance difference of a parasitic capacitor formed by the fifth sensing portion 2371 and the main sensing portion 231 and a parasitic capacitor formed by the fifth sensing portion 2371 and the sixth sensing portion 2372, which cause the sensing process to be simple. Lengths of the fifth sensing portion 2371 and the sixth sensing portion 2372 are equal. The length of the fifth sensing portion 2371 is larger than the length of the first sensing portion 2331. Widths of the main sensing portion 231, the fifth sensing portion 2371, and the sixth sensing portion 2372 are equal. In other embodiments, the widths of the main sensing portion 231, the fifth sensing portion 2371, and the sixth sensing portion 2372 are orderly decreased.

The first cavity 2351 receives the fifth sensing portion 2371 of the adjacent sensing electrode 23, and the second cavity 2326 receives the sixth sensing portion 2372 of the adjacent sensing electrode 23. The third cavity 2381 receives the third sensing portion 2334 of the adjacent sensing electrode 23, and the fourth cavity 2383 receives the fourth sensing portion 2336 of the adjacent sensing electrode 23. The fifth cavity 2385 receives the first sensing portion 2331 of the adjacent sensing electrode 23, and the sixth cavity 2387 receives the second sensing portion 2332 of the adjacent sensing electrode 23.

The signal line 28 connects with the main sensing portion 231 of the sensing electrode 23. The signal line 28 outputs a corresponding signal for indicating a pressing operation on the touch display apparatus 100. While the pressing operation is occurring on the touch display apparatus 100, amplitude of the signal output by the signal line 28 is adjusted.

FIG. 5 illustrates that the touch display apparatus 100 is being pressed. The touch module 20 includes four sensing electrodes 23a-23d. The main sensing portions 231 of the four sensing electrodes 23a-23d are spaced from each other, and are arranged in a column. The second solid portion 237 of the sensing electrode 23a is received in the first receiving portion 235 of the sensing electrode 23b. The first solid portion 233 of the sensing electrode 23b is received in the second receiving portion 238 of the sensing electrode 23a, and the second solid portion 237 of the sensing electrode 23b is received in the first receiving portion 235 of the sensing electrode 23c. The first solid portion 233 of the sensing electrode 23c is received in the second receiving portion 238 of the sensing electrode 23b, and the second solid portion 237 of the sensing electrode 23c is received in the first receiving portion 235 of the sensing electrode 23d. The first solid portion 233 of the sensing electrode 23d is received in the second receiving portion 238 of the sensing electrode 23c. While a pressed area A on the touch display apparatus 100 is touched, an overlapping area of the sensing electrode 23c and the pressed area A is larger than an overlapping area of the sensing electrode 23b and the pressed area A, and the overlapping area of the sensing electrode 23b and the pressed area A is larger than an overlapping area of the sensing electrode 23d and the pressed area A. Amplitudes of the signal output by the signal line 28b-28d are increased. A sensitivity of the touch display apparatus 100 is improved.

Figure 6:
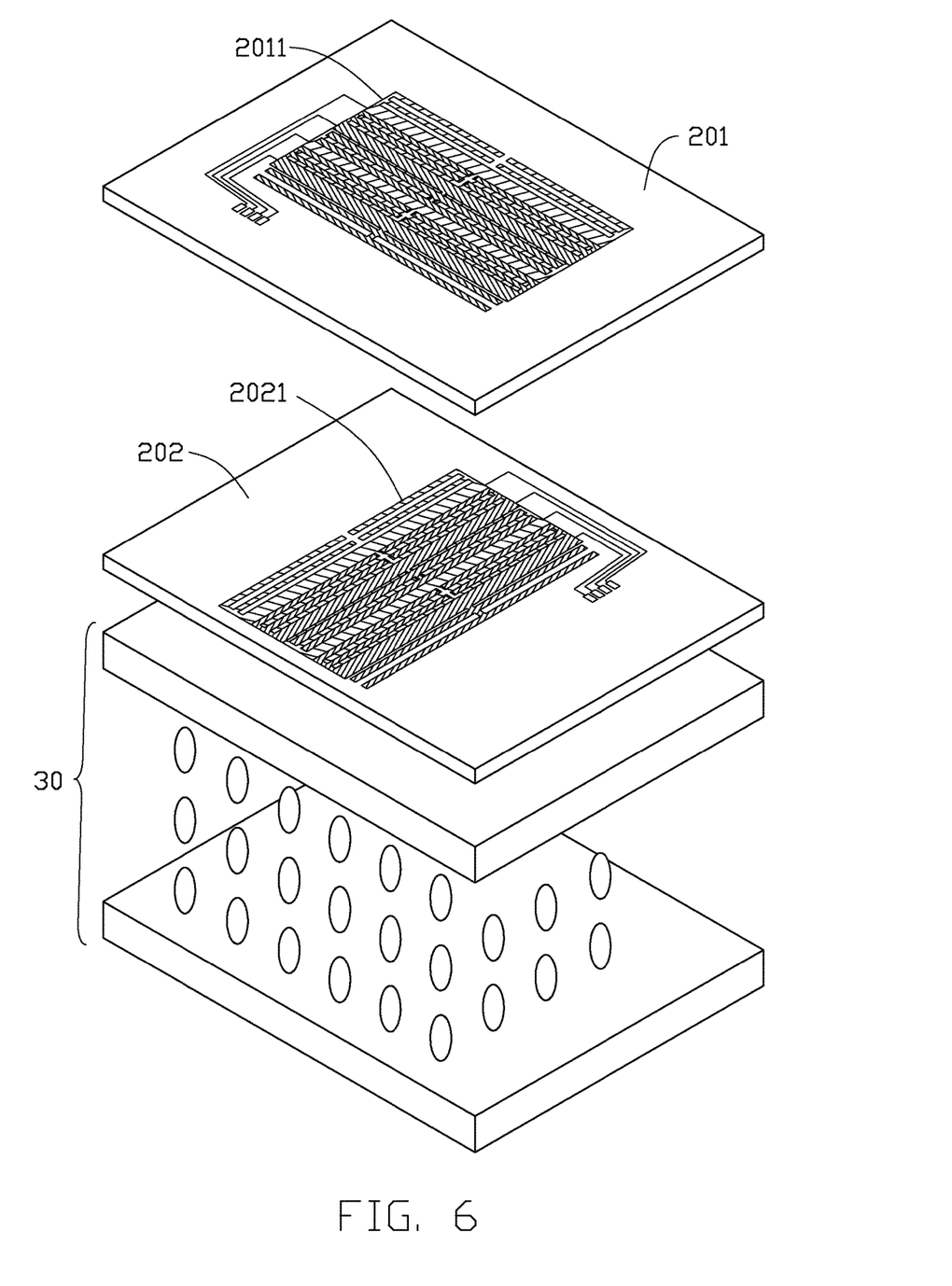
FIG. 6 is an exploded, isometric view of a second embodiment of the touch display apparatus of FIG. 1.

FIG. 6 illustrates a second embodiment of the touch module 20. The touch module 20 includes a first sensing electrode layer 201 and a second sensing electrode 202 overlapping the first sensing electrode layer 201. The first sensing electrode layer 201 includes a first sensing electrode unit 2011. The second sensing electrode layer 202 includes a second sensing electrode unit 2021 corresponding to the first sensing electrode unit 2011. The sensing electrode unit 2011 is arranged along a first direction. The sensing electrode unit 2021 is arranged along a second direction perpendicular to the first direction. The sensing electrode unit 2011 on the first sensing layer 201 cooperates with the corresponding sensing electrode unit 2021 on the second sensing layer 202 to locate a touch position on the touch display apparatus 100.

Each first sensing electrode unit 2011 and the second electrode unit 2021 includes a plurality of sensing electrodes 23 and a plurality of signal lines 28 connected to the corresponding sensing electrode 23. Two adjacent sensing electrodes 23 are engaged with each other. The sensing electrode 23c in both the first sensing electrode unit 2011 and the second electrode unit 2021 is engaged with two adjacent sensing electrodes 23d, 23b that the sensing electrode 23c is placed between (as shown in FIG. 5).

The sensing electrode 23 includes a main sensing portion 231, a first sub-sensing portion 232, and a second sub-sensing portion 234. The first sub-sensing portion 232 and the second sub-sensing portion 234 are symmetrically located on opposite surfaces of the main sensing portion 231, and are electrically connected to the main sensing portion 231. The first sub-sensing portion 232 is received in the second sub-sensing portion 234 of the adjacent sensing electrode 23.

The main sensing portion 231 is substantially rectangular shaped. The first sub-sensing portion 232 includes a first solid portion 233. The first solid portion 233 includes a first sensing portion 2331, a second sensing portion 2332 spaced from the first sensing portion 2331, a third sensing portion 2334, and a fourth sensing portion 2336 spaced from the third sensing portion 2334. The first sensing portion 2331 and the second sensing portion 2332 are arranged in a line parallel with the main sensing portion 231. An end of the first sensing portion 2331 away from the second sensing portion 2332 is electrically connected to an end of the main sensing portion 231, and an end of the second sensing portion 2332 away from the first sensing portion 2331 is electrically connected to an opposite end of the main sensing portion 231. The third sensing portion 2334 is located on a surface of first sensing portion 2331 away from the main sensing portion 231, and the fourth sensing portion 2336 is located on a surface of the second sensing portion 2332 away from the main sensing portion 231. The third sensing portion 2334 and the fourth sensing portion 2336 are arranged in a line parallel with the main sensing portion 231. An end of the third sensing portion 2334 away from the fourth sensing portion 2336 is electrically connected to the end of the first sensing portion 2331, and an end of the fourth sensing portion 2336 away from the third sensing portion 2334 is electrically connected to the end of the second sensing portion 2332. The first sub-sensing portion 232 defines a first receiving portion 235. The first receiving portion 235 includes a first cavity 2351 and a second cavity 2352, which are parallel with the main sensing portion 231. The first cavity 2351 and the second cavity 2352 communicate with each other. The first sensing portion 2331, the second sensing portion 2332, the third sensing portion 2334, and the fourth sensing portion 2336 cooperate with each other to form the second cavity 2352. The first sensing portion 2331, the second sensing portion 2332, and the main sensing portion 231 cooperate with each other to form the first cavity 2351. In at least one embodiment, a distance between the first sensing portion 2331 and the third sensing portion 2334 is equal to a distance between the first sensing portion 2331 and the main sensing portion 231. A width of the first sensing portion 2331 is equal to the second sensing portion 2332, and a width of the third sensing portion 2334 is equal to the fourth sensing portion 2336. Widths of the main sensing portion 231, the first sensing portion 2331, and the third sensing portion 2334 are equal. In other embodiments, the widths of the main sensing portion 231, the first sensing portion 2331, and the third sensing portion 2334 are orderly decreased.

The second sub-sensing portion 234 is located on a lower surface of the main sensing portion 231. The second sub-sensing portion 234 includes a second solid portion 237. A pattern of the second solid portion 237 corresponds to a pattern of the first receiving portion 235. The second solid portion 237 includes a fifth sensing portion 2371 and a sixth sensing portion 2372 parallel with the fifth sensing portion 2371. The fifth sensing portion 2371 is located on a surface of the main sensing portion 231 away from the first sub-sensing portion 234. The sixth sensing portion 2372 is located on a surface of the fifth sensing portion 2371 away from the main sensing portion 231. A middle of the fifth sensing portion 2371 is electrically connected to the main sensing portion 231. A middle of the sixth sensing portion 2372 is electrically connected to the middle of the fifth sensing portion 2371. The second sub-sensing portion 234 defines a second receiving portion 238. A pattern of the second receiving portion 238 corresponds to a pattern of the first solid portion 233. The second receiving portion 238 includes a third cavity 2381, a fourth cavity 2383, a fifth cavity 2385, and a sixth cavity 2387. The third cavity 2381 and the fourth cavity 2383 are arranged in a line parallel with the main sensing portion 231, and are separated by the fifth sensing portion 2371. The main sensing portion 231 and the fifth sensing portion 2371 cooperate with each other to form the third cavity 2381 and the fourth cavity 2383. The fifth cavity 2385 and the sixth cavity 2387 are arranged in a line parallel with the main sensing portion 231, and are separated by the sixth sensing portion 2371. The fifth sensing portion 2371 and the sixth sensing portion 2372 cooperate with each other to form the fifth cavity 2385 and the sixth cavity 2387. In at least one embodiment, a distance between the main sensing portion 231 and the fifth sensing portion 2371 is equal to a distance between the fifth sensing portion 2371 and the sixth sensing portion 2372. Widths of the main sensing portion 231, the fifth sensing portion 2371, and the sixth sensing portion 2372 are equal. In other embodiments, the widths of the main sensing portion 231, the fifth sensing portion 2371, and the sixth sensing portion 2372 are orderly decreased.

The first cavity 2351 receives the fifth sensing portion 2371 of the adjacent sensing electrode 23, and the second cavity 2326 receives the sixth sensing portion 2372 of the adjacent sensing electrode 23. The third cavity 2381 receives the third sensing portion 2334 of the adjacent sensing electrode 23, and the fourth cavity 2383 receives the fourth sensing portion 2336 of the adjacent sensing electrode 23. The fifth cavity 2385 receives the first sensing portion 2331 of the adjacent sensing electrode 23, and the sixth cavity 2387 receives the second sensing portion 2332 of the adjacent sensing electrode 23.

The signal line 28 connects with the main sensing portion 231 of the sensing electrode 23. The signal line 28 outputs a corresponding signal for indicating a pressing operation on the touch display apparatus 100. While the pressing operation is occurring on the touch display apparatus 100, amplitude of the signal output by the signal line 28 is adjusted.

Based on the structure of the touch module, each sensing electrode is engaged with two adjacent sensing electrodes that the sensing electrode is placed between, and at least two adjacent electrodes cooperate to sense a touch operation on the touch display apparatus. Therefore, a sensitivity of the touch display apparatus 100 is improved.

While various exemplary and preferred embodiments have been described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A touch module comprising:
a plurality of sensing electrodes engaged with each other; and
a plurality of signal lines electronically connected to a corresponding sensing electrode from amongst the plurality of sensing electrodes;
wherein each of the plurality of sensing electrodes is engaged with at least one adjacent sensing electrode; each of the plurality of sensing electrodes comprises a main sensing portion, a first sub-sensing portion, and a second sub-sensing portion; the first sub-sensing portion and the second sub-sensing are symmetrically located on opposite surfaces of the main sensing portion; the first sub-sensing portion and the second sub-sensing are electrically connected to the main sensing portion; the first sub-sensing portion comprises a first solid portion; the second sub-sensing portion comprises a second solid portion; the first sub-sensing portion defines a first receiving portion, the second sub-sensing portion defines a second receiving portion; the first solid portion is capable of receiving in the second receiving portion of the adjacent engaged sensing electrode; and the second solid portion is capable of receiving in the first receiving portion of the adjacent engaged sensing electrode; the first solid portion comprises a first sensing portion, a second sensing portion, a third sensing portion parallel with the first sensing portion, and a fourth sensing portion parallel with the second sensing portion; the second solid portion comprises a fifth sensing portion parallel with the main sensing portion and a sixth sensing portion parallel with the fifth sensing portion; the first sensing portion and the second sensing portion are arranged in a line parallel with the main sensing portion; the third sensing portion and the fourth sensing portion are arranged in a line parallel with the main sensing portion; the third sensing portion is located between the main sensing portion and the first sensing portion, the fourth sensing portion is located between the main sensing portion and the second sensing portion; the fifth sensing portion is located between the main sensing portion and the sixth sensing portion; a distance between the first sensing portion and the third sensing portion is equal to a distance between the third sensing portion and the main sensing portion for decreasing a capacitance difference between a parasitic capacitor formed by the first sensing portion and the third sensing portion and a parasitic capacitor formed by the third sensing portion and the main sensing portion; a distance between the fifth sensing portion and the main portion is equal to a distance between the fifth sensing portion and the sixth sensing portion for decreasing a capacitance difference between a parasitic capacitor formed by the fifth sensing portion and the sixth sensing portion and a parasitic capacitor formed by the fifth sensing portion and the main sensing portion.

2. The touch module of claim 1, wherein an end of the first sensing portion away from the second sensing portion is electrically connected to an end of the main sensing portion, and an end of the second sensing portion away from the first sensing portion is electrically connected to an opposite end of the main sensing portion.

3. The touch module of claim 1, wherein the third sensing portion is located on a surface of the first sensing portion away from the main sensing portion, and the fourth sensing portion is located on a surface of the second sensing portion away from the main sensing portion; an end of the third sensing portion away from the fourth sensing portion is electrically connected to the end of the first sensing portion, and an end of the fourth sensing portion away from the third sensing portion is electrically connected to the end of the second sensing portion.

4. The touch module of claim 1, wherein the first receiving portion comprises a first cavity and a second cavity communicated with the first cavity; the first sensing portion, the second sensing portion, the third sensing portion, and the fourth sensing portion cooperate with each other to form the second cavity; the second sensing portion and the main sensing portion cooperate with each other to form the first cavity; the first cavity and the second cavity cooperate with each other to totally receive the second solid portion of the adjacent engaged sensing electrode.

5. The touch module of claim 1, wherein a width of the first sensing portion is equal to the second sensing portion, a width of the third sensing portion is equal to the fourth sensing portion; widths of the main sensing portion, the first sensing portion, and the second sensing portion are equal.

6. The touch module of claim 1, wherein a width of the first sensing portion is equal to the second sensing portion, a width of the third sensing portion is equal to the fourth sensing portion; widths of the main sensing portion, the first sensing portion, and the second sensing portion are orderly decreased.

7. The touch module of claim 1, wherein the fifth sensing portion is located on a surface of the main sensing portion away from the first sub-sensing portion; the sixth sensing portion is located on a surface of the fifth sensing portion away from the main sensing portion; the fifth sensing portion is received in the first cavity of the adjacent engaged sensing electrode, and the sixth sensing portion is received in the second cavity of the adjacent engaged sensing electrode; a middle of the fifth sensing portion is electrically connected to the main sensing portion; a middle of the sixth sensing portion is electrically connected to the middle of the fifth sensing portion.

8. The touch module of claim 1, wherein the second receiving portion comprises a third cavity, a fourth cavity, a fifth cavity, and a sixth cavity; the main sensing portion and the fifth sensing portion cooperate with each other to form the third cavity and the fourth cavity; the fifth sensing portion and the sixth sensing portion cooperate with each other to form the fifth cavity and the sixth cavity; the third cavity receives the first sensing portion of the adjacent engaged sensing electrode, the fourth cavity receives the second sensing portion of the adjacent engaged sensing electrode, the fifth cavity receives the third sensing portion of the adjacent engaged sensing electrode, the sixth cavity receives the fourth sensing portion of the adjacent engaged sensing electrode.

9. The touch module of claim 1, wherein widths of the main sensing portion, the fifth sensing portion, and the sixth sensing portion are equal.

10. The touch module of claim 1, wherein the touch module further comprises a first sensing electrode layer and a second sensing electrode layer cooperating with the first sensing electrode layer to locate a touch position on the touch display apparatus; each of the first sensing electrode layer and the second sensing electrode layer comprise the plurality of sensing electrodes and the plurality of sensing lines.

11. The touch module of claim 1, wherein lengths of the first sensing portion, the second sensing portion, the third sensing portion, and the fourth sensing portion are equal, and length of the fifth sensing portion and the sixth sensing portion are equal.

12. The touch module of claim 11, wherein the length of the fifth sensing portion is larger than the length of the first sensing portion.

13. The touch module of claim 1, wherein the main sensing portion is electrically connected to the corresponding signal line.

* * * * *